(12) United States Patent
Li et al.

(10) Patent No.: US 7,799,117 B1
(45) Date of Patent: Sep. 21, 2010

(54) GAS TREATMENT PROCESS BY TEMPERATURE SWING ADSORPTION

(75) Inventors: Lin Li, Albany, CA (US); Mark E. Schott, Palatine, IL (US); Andrew S. Zarchy, Kildeer, IL (US); Bradley P. Russell, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 911 days.

(21) Appl. No.: 11/535,630

(22) Filed: Sep. 27, 2006

(51) Int. Cl.
*B01D 53/02* (2006.01)

(52) U.S. Cl. .................. 95/96; 95/99; 95/105; 95/106; 95/114; 96/126; 96/130; 96/146

(58) Field of Classification Search ............... 95/96, 95/99, 105, 106, 114; 96/126, 130, 146
See application file for complete search history.

(56) References Cited

U.S. PATENT DOCUMENTS

| | | | |
|---|---|---|---|
| 3,458,973 A * | 8/1969 | Greathouse et al. ........... 95/144 |
| 3,885,927 A | 5/1975 | Sherman et al. ................ 55/68 |
| 5,094,755 A | 3/1992 | Knaebel ..................... 210/677 |
| 5,298,054 A | 3/1994 | Malik ............................ 95/99 |
| 5,601,634 A | 2/1997 | Jain et al. ...................... 95/114 |
| 5,728,198 A | 3/1998 | Acharya et al. ................ 95/114 |
| 5,846,295 A | 12/1998 | Kalbassi et al. ............... 95/105 |
| 5,914,455 A | 6/1999 | Jain et al. ...................... 95/96 |
| 6,402,814 B1 | 6/2002 | Kraus et al. ................... 95/106 |
| 6,432,171 B1 | 8/2002 | Kumar et al. ................. 95/120 |
| 6,503,298 B1 | 1/2003 | Monzyk et al. ................ 95/96 |
| 7,022,159 B2 | 4/2006 | Kalbassi et al. ............... 95/99 |

* cited by examiner

*Primary Examiner*—Robert A Hopkins
(74) *Attorney, Agent, or Firm*—Mark Goldberg

(57) ABSTRACT

A thermal sink is used to recover heat from a product gas leaving an adsorption vessel in a thermal swing adsorption process. Heat that is recovered from the product gas is used to heat a regeneration gas during the subsequent regeneration of the adsorbent material within the adsorption vessel. The step in which the regenerated bed of adsorbent material is cooled prior to returning to adsorption mode is eliminated.

18 Claims, 4 Drawing Sheets

GAS TREATMENT PROCESS BY TEMPERATURE SWING ADSORPTION

FIELD OF THE INVENTION

This invention relates to a process and apparatus for treating a feed gas. In particular, this invention relates to a Thermal Swing Adsorption (TSA) process using at least two adsorption beds for removing or at least reducing the level of at least one component in a feed gas to render it suitable for downstream processing and an apparatus for use in the process. This invention is especially useful for removing components from a feed gas, such as natural gas, upstream of a membrane process.

BACKGROUND OF THE INVENTION

Where a feed gas is to be subjected to downstream processing, it may often be desirable or necessary to remove certain components from the feed gas prior to such processing. As an example, water, carbon dioxide, or hydrocarbon compounds may be present in a feed gas, for example, natural gas or air where the feed gas is to be subsequently treated in a downstream process, for example, a membrane process for removal of carbon dioxide or a cryogenic distillation process for air separation. If these materials are not removed, they may cause, for example, fouling or deterioration of equipment in a downstream process or result in other disadvantages in the downstream process.

Many methods for removing an undesired component from a feed gas involve adsorption of the undesired component onto a solid adsorbent by passing the feed gas through an adsorbent bed. One such method is Temperature Swing Adsorption (TSA). Conventional TSA systems are described in, for example, U.S. Pat. No. 5,846,295 and U.S. Pat. No. 7,022,159. In a simple TSA system, two adsorbent beds are employed in a parallel arrangement with one bed being operated for adsorption while the other bed is being regenerated. An adsorption bed is said to be "on-line" during an adsorption step and "off-line" while being regenerated. Alternatively, a TSA system may contain three adsorbent beds, with one bed being operated for adsorption while the other two beds are being regenerated. It is also common practice to use two or more adsorbent beds in parallel "on-line" adsorption in order to accommodate higher feed gas flow rates. In all of these TSA systems, the absorption beds are periodically switched between adsorption and regeneration during an operating cycle.

In a TSA process, adsorption of undesired components is typically promoted by low temperatures. Once adsorption of an undesired component has been carried out in a first adsorbent bed at a low temperature, the flow of feed gas is switched from the first adsorbent bed to a second adsorbent bed. The first adsorbent bed is then regenerated. Regeneration typically includes a heating step. In the heating step, the first adsorbent bed is exposed to a hot regeneration gas at a high temperature which strips the adsorbed materials from the first adsorbent bed and so regenerates it for further use. Typically, the hot regeneration gas is a waste stream or other gas from a downstream process or else a portion of the product gas. Because adsorption is promoted by low temperatures, regeneration typically also includes a cooling step subsequent to exposing the first adsorbent bed to the hot regeneration gas. In the cooling step, the first adsorbent bed is subjected to a flow of cooling gas, which cools the first adsorbent bed down from approximately the high temperature of the hot regeneration gas to approximately the low adsorption temperature in readiness for a subsequent adsorption step.

The operating cost of a TSA system is largely comprised of the cost of the heat required to regenerate an adsorbent bed. The heat for regenerating an adsorbent bed is typically supplied by a regeneration heater. In order to reduce the operating cost of a TSA system, it is desirable to recover heat from an adsorbent bed after it has been exposed to a hot regeneration gas. Preferably, the heat from the adsorbent bed is recovered during the cooling step. In order to accomplish such heat recovery, a TSA system must comprise at least three absorption beds, with two of the adsorption beds being off-line and operated for regeneration at any given time. One of the absorption beds being regenerated will be in the heating step and the other adsorbent bed being regenerated will be in the cooling step. In this arrangement, an effluent gas from the adsorbent bed in the cooling step is used as the feed gas for the adsorbent bed in the heating step and hence, the heat from the adsorbent bed in the cooling step is recovered. This arrangement thus reduces the heating requirement of the regeneration heater and thereby reduces the operating cost of the TSA system. However, the capital and equipment cost of such a TSA system is increased relative to a simple TSA system because of the greater number of adsorbent beds required—a minimum of three adsorption beds compared to only two adsorption beds for a simple TSA system. Therefore, a TSA system and TSA process in which operating costs are reduced by heat recovery, without increasing the number of adsorbent beds and capital cost required is desired.

SUMMARY OF THE INVENTION

The object of the present invention is to reduce the capital and operating costs of a TSA system and/or to increase the productivity of the system. It has been discovered that the capital and operating costs of such a system can be substantially reduced by eliminating the cooling step typically associated with the regeneration of the adsorbent bed and by using a thermal sink to heat the regeneration gas.

BRIEF DESCRIPTION OF THE DRAWINGS

The present invention will now be described with reference to the attached drawings in which.

DETAILED DESCRIPTION OF THE INVENTION

Figure 1:
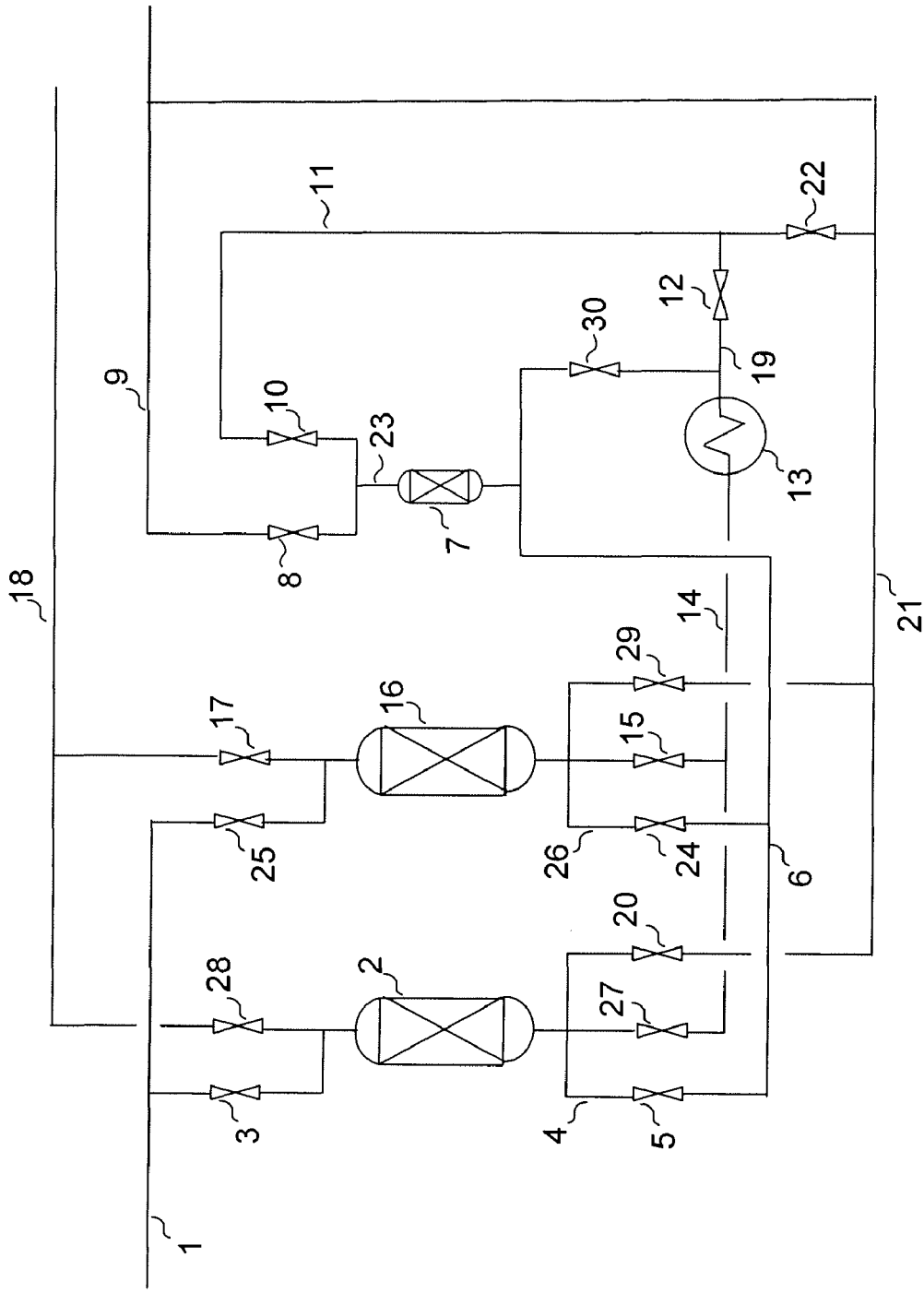
FIG. 1 shows in schematic form an apparatus for use in practicing the invention.

Referring now to FIG. 1, the figure shows one embodiment of the invention in which in a first phase of operation a feed gas comprising a contaminant is passed through a line 1 into a first adsorption vessel 2 via an open isolation valve 3. The feed gas is fed to the adsorption vessel 2 at a feed gas temperature which is preferably in the range 15° C. (59° F.) to 50° C. (122° F.). The first adsorption vessel 2 contains an adsorbent material for carrying out a temperature swing adsorption process. Suitable adsorbent materials are well known to those skilled in the art and include natural and synthetic zeolites, activated carbon, silica gel, and alumina. A first product gas substantially depleted of contaminants and heated by contact with the adsorbent material is withdrawn from the first adsorption vessel 2 through a line 4 to an open isolation valve 5, leaving the contaminant substantially adsorbed on the adsorbent material in the first adsorption vessel 2. The first product gas from the isolation valve 5 is sent via a line 6 to a thermal sink 7, where it is cooled by contact with the thermal sink 7 to form a second product gas. The thermal sink 7 comprises a means of storing thermal energy. Hence, the thermal sink 7 absorbs and stores thermal energy from the first product gas. Several means of storing thermal energy are known to those skilled in the art and include packed beds of granular material of high heat capacity such as ceramic balls, packed beds of metal shot or ball bearings, compressed or sintered metallic structures, and ceramic monolithic structures. In one embodiment of the present invention, the thermal sink 7 is sized to have a product (mass times specific heat capacity, with units of kJ/° C.) substantially equal to or greater than a product (mass times specific heat capacity, with units of kJ/° C.) of the adsorption vessel 2 and the adsorbent material contained therein.

A first portion of the second product gas leaving the thermal sink 7 is withdrawn through a line 23 and an open isolation valve 8 into a product gas line 9 to form a net product gas. The net product gas is suitable for use in downstream processes or other applications. A fraction of the net product gas, preferably between approximately 1% to approximately 20%, is withdrawn through an open isolation valve 22 and an open isolation valve 12 and is sent via a line 19 to a heater 13 at a heater operating temperature where it is heated to form a hot regeneration gas at a hot regeneration gas temperature. The hot regeneration gas temperature will depend on the nature of the feed gas, the contaminant within the feed gas, and the type of adsorbent material and will generally be between approximately 100° C. (180° F.) and 300° C. (540° F.) hotter than the feed gas temperature. The heater 13 is supplied with a means of providing heat to a gas entering via the line 19. For example, the heater 13 may comprise an electric heater, a steam heater, a fired heater, a hot oil heater or other types of heater known in the art. The hot regeneration gas from the heater 13 is sent via a line 14 to an open isolation valve 15 and hence to a second adsorption vessel 16 that is undergoing regeneration. The second adsorption vessel 16 is of substantially the same dimensions as the first adsorption vessel 2 and preferably contains an adsorbent material that is the same as that used in the first adsorption vessel 2. The hot regeneration gas causes desorption of the contaminants from the adsorbent material in the second adsorption vessel 16 and forms a tail gas stream. The tail gas stream is withdrawn from the second adsorption vessel 16 via an open isolation valve 17 and is discharged into a tail gas line 18. All other valves shown in FIG. 1 remain closed during the first phase of operation.

In a subsequent second phase of operation, the isolation valve 5 is closed and an isolation valve 20 is opened, causing the first product gas to flow from the adsorption vessel 2 via a line 21 into the product gas line 9 to form a net product gas. An isolation valve 22 is opened, causing a portion, preferably between approximately 1% to approximately 20%, of the first product gas to flow via the line 11 to the open isolation valve 10. The isolation valve 8 is closed, causing the portion of the first product gas flowing from the isolation valve 10 to flow via the line 23 into the thermal sink 7, where it is heated by contact with the thermal sink 7 to form a second hot regeneration gas at a second hot regeneration gas temperature. The second hot regeneration gas temperature will depend on the thermal energy from the first product gas from adsorption vessel 2 that is stored in the thermal sink 7 and will be less than or equal to the heater operating temperature of the heater 13, which is between approximately 100° C. (180° F.) and 300° C. (540° F.) hotter than the feed gas temperature. The second hot regeneration gas leaves the thermal sink 7 through an open isolation valve 30 via the line 19 into the heater 13. The amount of heat that must be supplied by the heater 13 to the second hot regeneration gas during the second phase of operation is reduced because the second hot regeneration gas has been pre-heated by the thermal sink 7 upstream of the heater 13, thereby improving the fuel efficiency and economy of the process. Optionally, the heating means to the heater 13 may be discontinued entirely during the second phase of operation, with all of the heat supplied to the second hot regeneration gas by the thermal sink 7 from the thermal energy stored therein. The second hot regeneration gas leaves the heater 13 via the line 14 and passes through an open isolation valve 15 into the second adsorption vessel 16. The second hot regeneration gas causes desorption of the contaminants from the adsorbent material in the second adsorption vessel 16 and forms a second tail gas stream. The second tail gas stream is withdrawn from the second adsorption vessel 16 via the open isolation valve 17 and is discharged into the tail gas line 18. All other valves shown in FIG. 1 remain closed during the second phase of operation.

In a subsequent third phase of operation, the isolation valve 3 is closed and an isolation valve 25 is opened, causing the feed gas to flow through the line 1 into the second adsorption vessel 16 via the open isolation valve 25. A second adsorption vessel first product gas substantially depleted of contaminant is withdrawn from the second adsorption vessel 16 through a line 26 to an open isolation valve 24. The second adsorption vessel first product gas from the isolation valve 24 is sent via the line 6 to the thermal sink 7, where it is cooled by contact with the thermal sink 7 to form a second adsorption vessel second product gas. The thermal sink 7 absorbs thermal energy from the second adsorption vessel first product gas and stores the thermal energy for subsequent use. A first portion of the second adsorption vessel second product gas leaving the thermal sink 7 is withdrawn through the line 23 and the open isolation valve 8 into the product gas line 9 to form a net product gas. A fraction of the net product gas, preferably between approximately 1% to approximately 20%, is withdrawn through the open isolation valve 22 and the open isolation valve 12 and is sent via the line 19 to the heater 13 where it is heated to form a third hot regeneration gas at a third hot regeneration gas temperature. The third hot regeneration gas temperature will depend on the nature of the feed gas, the contaminant within the feed gas, and the type of adsorbent material and will generally be between approximately 100° C. (180° F.) and 300° C. (540° F.) hotter than the feed gas temperature. The third hot regeneration gas from the heater 13 is sent via the line 14 to an open isolation valve 27 and hence to the first adsorption vessel 2 that is now undergoing regeneration. The third hot regeneration gas causes desorption of the contaminants from the adsorbent material in the first adsorption vessel 2 and forms a third tail gas stream. The third tail gas stream is withdrawn from the first adsorption vessel 2 via an open isolation valve 28 and is discharged into the tail gas line 18. All other valves shown in FIG. 1 remain closed during the third phase of operation.

In a subsequent fourth phase of operation, the isolation valve 24 is closed and an isolation valve 29 is opened, causing the second adsorption vessel first product gas to flow from the second adsorption vessel 16 via the line 21 into the product gas line 9 to form a net product gas. The isolation valve 22 is opened, causing a portion, preferably between approximately 1% to approximately 20%, of the second adsorption vessel first product gas to flow via the line 11 to the open isolation valve 10. The isolation valve 8 is closed, causing the portion of the second adsorption vessel first product gas flowing from isolation valve 10 to flow via the line 23 into the thermal sink 7, where it is heated by contact with the thermal sink 7 to form a fourth hot regeneration gas at a fourth hot regeneration gas temperature. The fourth hot regeneration gas temperature will depend on the thermal energy from the second adsorption vessel first product gas that is stored in the thermal sink 7 and will be less than or equal to the operating temperature of the heater 13, which is generally between approximately 100° C. (180° F.) and 300° C. (540° F.) hotter than the feed gas temperature. The fourth hot regeneration gas leaves the thermal sink 7 through an open isolation valve 30 via the line 19 into the heater 13. The amount of heat that must be supplied by the heater 13 to the fourth hot regeneration gas during the fourth phase of operation is reduced because the fourth hot regeneration gas has been pre-heated by the thermal sink 7 upstream of the heater 13, thereby improving the fuel efficiency and economy of the process. Optionally, the heating means to the heater 13 may be discontinued entirely during the fourth phase of operation, with all of the heat supplied to the fourth hot regeneration gas by the thermal sink 7 from the thermal energy stored therein. The fourth hot regeneration gas leaves the heater 13 via the line 14 and passes through an open isolation valve 27 into the first adsorption vessel 2. The fourth hot regeneration gas causes desorption of the contaminants from the adsorbent in the first adsorption vessel 2 and forms a fourth tail gas stream. The fourth tail gas stream is withdrawn from the first adsorption vessel 2 via the open isolation valve 28 and is discharged into the tail gas line 18. All other valves shown in FIG. 1 remain closed during the fourth phase of operation.

The position of each of the valves described during each phase of operation is given in Table 1.

TABLE 1

Position of valves in FIG. 1 during various phases of operation

| Valve Number | Adsorption Vessel 2 On-line | | Adsorption Vessel 2 Off-line | |
|---|---|---|---|---|
| | First Phase | Second Phase | Third Phase | Fourth Phase |
| 3 | open | open | closed | closed |
| 5 | open | closed | closed | closed |
| 8 | open | closed | open | closed |
| 10 | closed | open | closed | open |
| 12 | open | closed | open | closed |
| 15 | open | open | closed | closed |
| 17 | open | open | closed | closed |
| 20 | closed | open | closed | closed |
| 22 | open | open | open | open |
| 24 | closed | closed | open | closed |
| 25 | closed | closed | open | open |
| 27 | closed | closed | open | open |
| 28 | closed | closed | open | open |
| 29 | closed | closed | closed | open |
| 30 | closed | open | closed | open |

The switching of valves from open to closed and from closed to open at the beginning of each phase of operation may be carried out in such a manner that all of the valves are switched substantially simultaneously, so that pressure fluctuations do not occur in the feed gas, net product gas or tail gas.

In a preferred embodiment of the invention, the duration of the first phase of operation is substantially equal to the duration of the third phase of operation and the duration of the second phase of operation is substantially equal to the duration of the fourth phase of operation. The duration of the first phase of operation is less than the duration of the second phase of operation. The ratio (duration of the second phase of operation/duration of the first phase of operation) depends on the nature of the feed gas, the contaminants contained within the feed gas, the type of adsorbent material used, the temperature and pressure at which an adsorption step is carried out, and the temperature and pressure at which a regeneration step is carried out. The ratio is preferably between 3 and 60, more preferably between 5 and 20, and most preferably about 10.

In the above described first embodiment of the invention, preferably a new adsorption step is begun substantially immediately after an adsorbent bed is regenerated. For example, substantially immediately after a fourth phase of operation has been completed, the isolation valve 3 can be opened thereby allowing the feed gas to again enter the adsorbent vessel 2. Hence the feed gas can be re-supplied to the adsorbent vessel 2 after a fourth phase of operation without pre-cooling of the adsorption vessel 2. Similarly, substantially immediately after a second phase of operation has been completed, the isolation valve 25 can be opened allowing the feed gas to re-enter the adsorption vessel 16. Thus, the feed gas can be re-supplied to the adsorption vessel 16 and a new adsorption step within the adsorption vessel 16 can be begun without pre-cooling of the adsorption vessel 16. Advantageously, the present invention by eliminating the cooling step associated with state of the art systems reduces the capital costs of a TSA system because an additional adsorbent bed to accommodate the cooling step is not required. The additional adsorbent bed that would be necessary in a state of the art TSA system to accommodate the cooling step is obviated by the thermal sink 7. Advantageously, the thermal sink 7 can be substantially smaller than an additional adsorbent bed, for example, between approximately ½ to ¼ of the volume of an additional adsorbent bed and is of simpler construction than an additional adsorbent bed, thereby reducing the overall equipment cost. Additionally, the present invention by eliminating the cooling step associated with state of the art systems reduces the operating cycle time of a TSA system. Because the operating cycle time is reduced, an apparatus according to the present invention can use substantially smaller adsorbent beds than state of the art systems to process the same mass flow rate of gas. The use of smaller adsorbent beds in the present invention substantially reduces the capital costs.

In a second embodiment of the invention, the first phase of operation is ended and the second phase of operation is started when the second product gas leaving the thermal sink 7 reaches a predetermined temperature. Preferably, the predetermined temperature is in the range approximately 1° C. (1.8° F.) to 30° C. (54° F.) hotter than the feed gas temperature. Most preferably, the predetermined temperature is about 5° C. (9° F.) hotter than the feed gas temperature.

The invention is further illustrated by the following example:

Example

In this example, the adsorption of pentane ("C5"), hexane ("C6"), heptane ("C7") and octane ("C8") from a feed gas stream of methane at a feed gas temperature of 38° C. (100° F.) using an adsorbent vessel containing an adsorbent bed comprising a silica gel adsorbent was simulated. In the process of this example the regeneration of the adsorbent material is carried out at a regeneration temperature of 260° C. (500° F.). In a base case, the adsorption vessel and its contents were cooled to a temperature equal to the feed gas temperature at the end of each regeneration step, as is the practice in state of the art systems. In the modified case representing the process of the invention, the feed gas stream was introduced immediately after the regeneration step without any cooling step.

Figure 2:
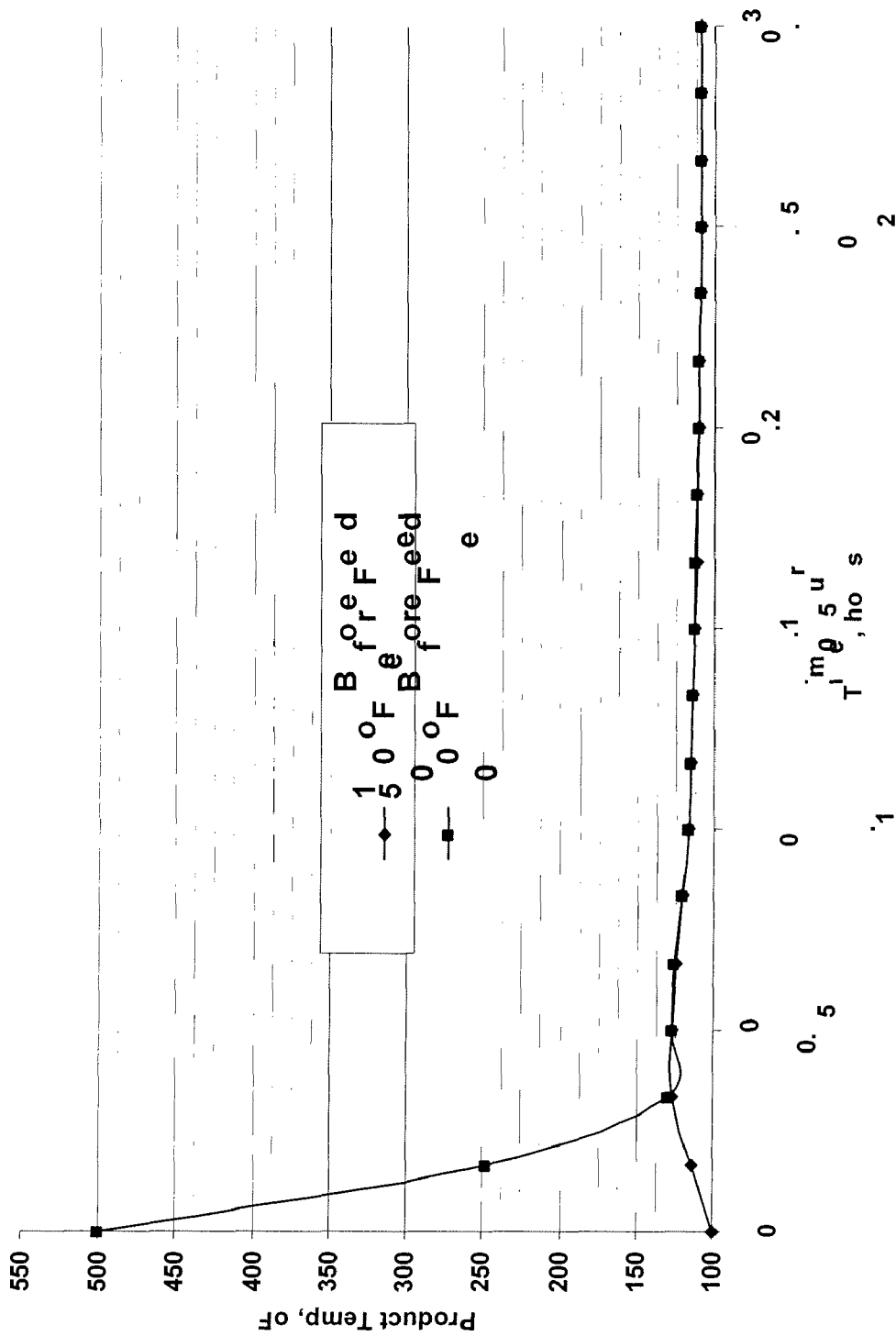
FIG. 2 is a plot of a product gas temperature vs. time.

FIG. 2 shows the temperature of a product gas at the exit of the adsorption vessel as a function of time during an adsorption step. In the base case the temperature of the product gas rises only slightly, due to the heat of adsorption. In the modified case representing the process of the invention, the product gas temperature is initially extremely high, starting at a temperature corresponding to the regeneration temperature, and then falls rapidly to reach the same temperature as the base case after a period of roughly 0.05 hours (3 minutes).

Figure 3:
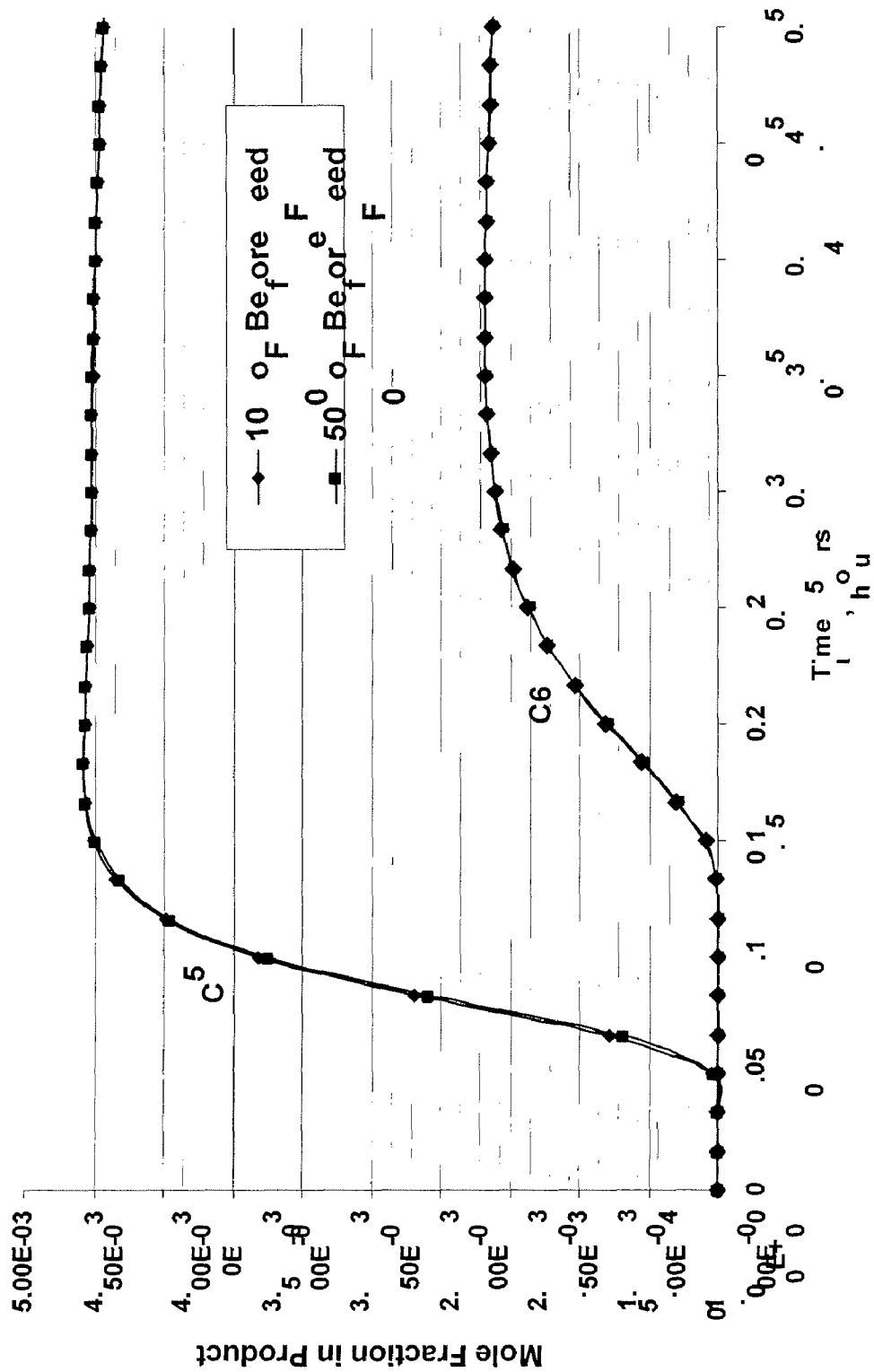
FIG. 3 is a plot of the mole fraction of pentane and hexane in a product gas vs. time.

FIG. 3 shows the mole fraction of pentane and hexane in the product gas as a function of time. A plot such as FIG. 3 is termed a "Breakthrough curve" by those skilled in the art, as it indicates the time taken for a contaminant to saturate the adsorbent material and hence break through the adsorbent bed to the product gas. It can be seen from FIG. 3 that the time taken for pentane and hexane to break through the adsorbent bed and emerge in the product gas is substantially the same in both the base case and the modified case representing the process of the invention. The omission of the cooling step in the process of the invention therefore has had no deleterious effect on the removal of pentane or hexane from the feed gas.

Figure 4:
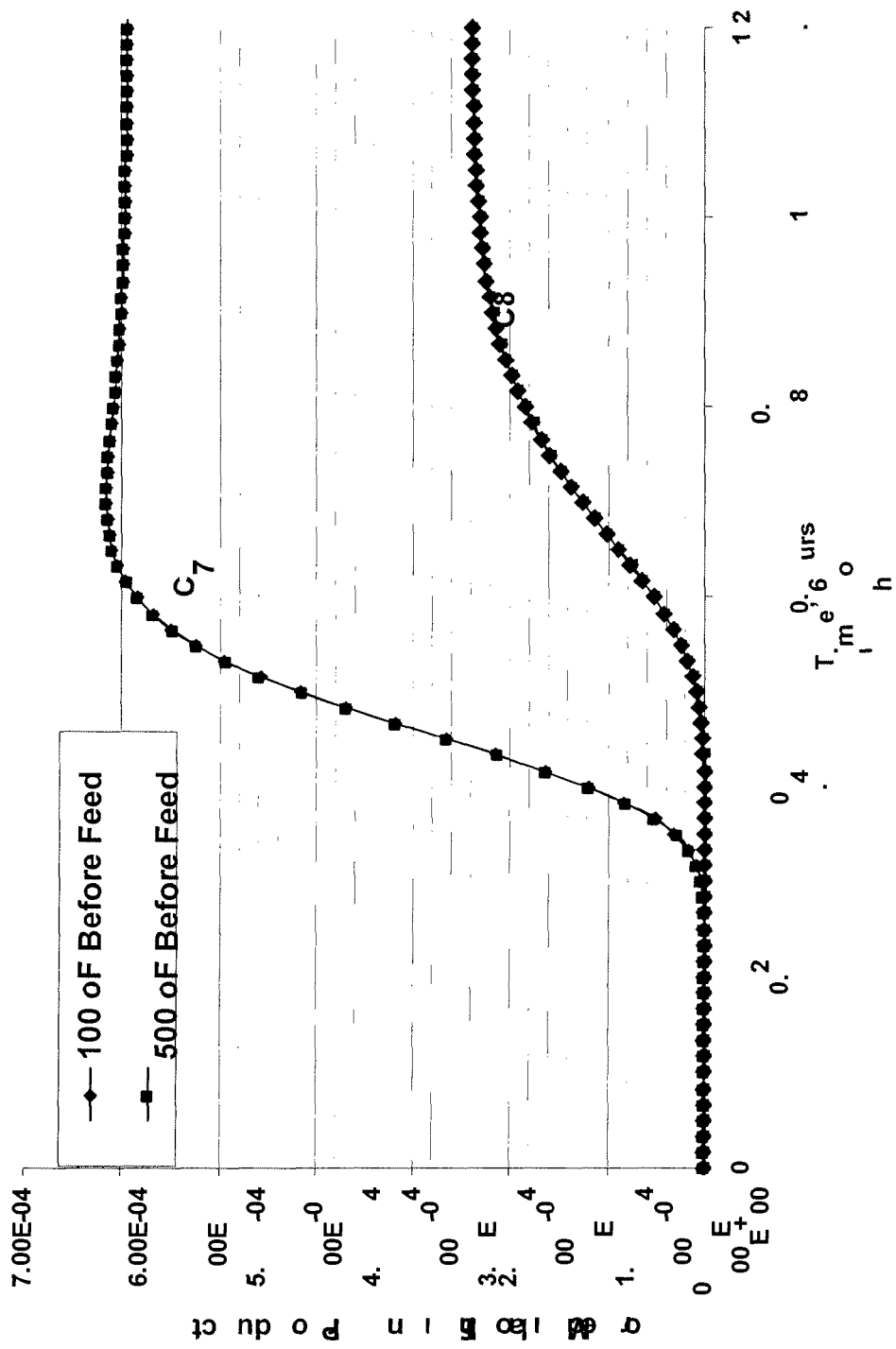
FIG. 4 is a plot of the mole fraction of heptane and octane in a product gas vs. time.

FIG. 4 shows the mole fraction of heptane and octane in the product gas as a function of time. It can be seen from FIG. 4 that the time taken for heptane and octane to break through the adsorbent bed and emerge in the product gas is substantially the same in both the base case and the modified case representing the process of the invention. The omission of the cooling step in the process of the invention therefore has had no deleterious effect on the removal of heptane or octane from the feed gas.

Additional embodiments of the invention can be readily envisioned by those skilled in the art, for example, using three or more adsorption vessels in the TSA system, with two or more adsorption beds on-line simultaneously in order to accommodate higher feed gas flow rates.

We claim:

1. A process for the treatment of a feed gas by Temperature Swing Adsorption (TSA) in at least two adsorbent beds comprising:
   (a) passing the feed gas through, an adsorbent bed to form a product gas during a first adsorption phase;
   (b) stopping the flow of feed gas to the adsorbent bed and regenerating the adsorbent bed by passing a hot regeneration gas through the adsorbent bed to form a hot regenerated adsorbent bed during a regeneration phase; and
   (c) stopping the flow of hot regeneration gas to the hot regenerated adsorbent bed and immediately restarting the flow of feed gas to the hot regenerated adsorbent bed during a second adsorption phase.

2. A process according to claim 1 in which a portion of the product gas is heated to form the hot regeneration gas.

3. A process according to claim 1 in which the product gas withdrawn at the start of an adsorption phase is contacted with a thermal sink to form a hot thermal sink.

4. A process according to claim 2 in which the regeneration gas is heated by contact with a hot thermal sink.

5. A process according to claim 3 in which the product gas flow is switched to bypass the thermal sink when the product gas exiting the thermal sink reaches a predetermined temperature.

6. A process according to claim 5 in which the predetermined temperature is in the range between 1° C. (1.8° F.) and 30° C. (54° F.) hotter than a temperature at which the feed gas is supplied to an adsorbent bed.

7. A process according to claim 3 in which a thermal sink is used to transfer heat from the product gas withdrawn at the start of an adsorption phase to the regeneration gas.

8. A process according to claim 4 in which a thermal sink is used to transfer heat from the product gas withdrawn at the start of an adsorption phase to the regeneration gas.

9. A process according to claim 7 in which the time during which the thermal sink is heated by the product gas is substantially less than the time during which the thermal sink heats the regeneration gas.

10. A process according to claim 1 in which a flow rate of product gas from an adsorbent bed differs substantially from a flow rate of hot regeneration gas to the adsorbent bed.

11. A temperature swing adsorption apparatus for removing at least one component from a feed gas comprising:
   (d) at least two thermal swing adsorption zones;
   (e) at least one thermal sink zone; and
   (f) a heater.

12. An apparatus according to claim 11 further comprising a means for switching a flow of feed gas between the thermal swing adsorption zones.

13. An apparatus according to claim 11 further comprising means for switching a flow of product gas from a thermal swing adsorption zone between a product outlet and a thermal sink zone.

14. An apparatus according to claim 11 further comprising means for switching a portion of a product gas flow from a thermal swing adsorption zone between a thermal sink zone and the heater.

15. An apparatus according to claim 11 in which a thermal mass of a thermal sink zone is substantially equal to or greater than a thermal mass of a thermal swing adsorption zone.

16. An apparatus according to claim 11 in which a thermal sink zone is packed with steel shot.

17. A process for reducing the concentration of at least one component in a feed gas comprising:
   (g) passing the feed gas to at least one first thermal swing adsorption zone containing at least one adsorbent material to form a first product gas;
   (h) cooling the first product gas by heat exchange with a thermal sink zone to form a second product gas;
   (i) heating a portion of the second product gas in a heater to form a regeneration gas; and
   (j) passing the regeneration gas to a second thermal swing adsorption zone to regenerate an adsorbent material.

18. A process according to claim 17 in which steps (a) through (d) comprise a first process phase and further comprising, in a subsequent process phase, bypassing the first product gas around the thermal sink zone to form a second product gas; heating a portion of the second product gas by heat exchange with the thermal sink zone to form a second regeneration gas; and passing the second regeneration gas to the second thermal swing adsorption zone to regenerate the adsorbent material.

* * * * *